United States Patent
Suzuki

(10) Patent No.: US 7,455,421 B2
(45) Date of Patent: Nov. 25, 2008

(54) BACKLIGHT DEVICE AND LIQUID CRYSTAL DISPLAY DEVICE INCORPORATING SAME

(75) Inventor: Shinichi Suzuki, Kitasaku-gun (JP)

(73) Assignee: Minebea Co., Ltd., Kitasaku (JP)

( * ) Notice: Subject to any disclaimer, the term of this patent is extended or adjusted under 35 U.S.C. 154(b) by 0 days.

(21) Appl. No.: 11/501,875

(22) Filed: Aug. 10, 2006

(65) Prior Publication Data

US 2007/0058376 A1    Mar. 15, 2007

(30) Foreign Application Priority Data

Sep. 9, 2005    (JP) ............... 2005-262190

(51) Int. Cl.
*F21V 23/02*    (2006.01)
(52) U.S. Cl. .............. 362/221; 362/216; 362/225
(58) Field of Classification Search ............. 362/29, 362/30, 216, 218, 221, 225, 260, 264, 265, 362/373; 315/56, 57, 58, 59, 169.3, 169.4, 315/274, 324
See application file for complete search history.

(56) References Cited

U.S. PATENT DOCUMENTS 5,270,910 A * 12/1993 Kile ..................... 362/216
7,274,282 B2 * 9/2007 Park et al. ............... 336/192
2006/0061982 A1 * 3/2006 Lee ......................... 362/29
2006/0255900 A1 * 11/2006 Kohno ..................... 336/212

FOREIGN PATENT DOCUMENTS

| GB | 2 273 001 A | 6/1994 |
| JP | A 1-237686 | 9/1989 |
| JP | A 2000-047208 | 2/2000 |

* cited by examiner

*Primary Examiner*—Y My Quach Lee
(74) *Attorney, Agent, or Firm*—Oliff & Berridge, PLC

(57) ABSTRACT

A backlight device includes a frame, at least one lamp unit each comprising a transformer and a discharge lamp structured into an integral and rigid unit, and also includes a circuit board for lighting the discharge lamp, which is disposed at the back surface of the frame and at which the transformer is mounted at. The transformer of the lamp unit includes: two terminal blocks having terminal pins; a bobbin having a primary winding and first and second secondary windings wound around an outer circumference of the winding core member; a magnetic core; and two lamp connecting terminals attached respectively to the terminal blocks and connected respectively to the first and second secondary windings, wherein the discharge lamp is attached to the transformer with electrodes of the discharge lamp connected directly to the lamp connecting terminals of the transformer, thus forming the lamp unit into a integral structure.

15 Claims, 10 Drawing Sheets

BACKLIGHT DEVICE AND LIQUID CRYSTAL DISPLAY DEVICE INCORPORATING SAME

BACKGROUND OF THE INVENTION

1. Field of the Invention

The present invention relates to a backlight device and also to a liquid crystal display device incorporating a backlight device, and particularly to a backlight device in which a lamp as a light source is attached directly to a transformer, and to a liquid crystal display device incorporating such a backlight device.

2. Description of the Related Art

A liquid crystal display (LCD), which is used as a display device for a liquid crystal monitor, a liquid crystal television, or the like, does not emit light by itself, and therefore requires a lighting system, such as a backlight device. Among such backlight devices are an edge light type in which a cold cathode lamp as a light source is disposed at a side of a light conductive plate wherein light emitted from the lamp is introduced into the light conductive plate from the side and exits out from one major surface of the light conductive plate so as to illuminate a light diffusing plate, and a direct illumination type in which a discharge lamp as a light source, such as a cold cathode lamp, is disposed immediately behind a light diffusing plate wherein light emitted from the lamp illuminates directly the light diffusing plate.

A large LCD display for use as a display device in a liquid crystal television requires illumination with high brightness, and therefore employs mainly a direct illumination type back light device provided with a plurality of lamps. In such a direct illumination type backlight device using a plurality of lamps, the output signal from a transformer at which a high voltage is generated by an inverter is applied to the lamps via connectors and lamp cables so as to light the lamps (refer to, for example, Japanese Patent Application Laid-Open No. 2000-47208, FIGS. 1 and 5).

FIG. 14A is a perspective exploded view of an LCD device 200 disclosed in the aforementioned Japanese Patent Application Laid-Open No. 2000-47208. The LCD device 200 of FIG. 14A includes an upper metal frame 201, an LCD panel 202, LCD panel driving circuit boards 218, 219 and 220, a light diffusing sheet 203, a light diffusing plate 204, lamp reflectors 205, a plurality of line-like lamps 206, a plastic molded case 207, a lower metal frame 208, and a high-voltage and high frequency AC generating circuit (inverter circuit) board 209. The inverter circuit board 209 is attached to the back side (bottom side in the figure) of the lower metal frame 208 and the plastic molded case 207.

FIG. 14B is a top plan view of the relevant portion of a backlight device incorporated in the LCD device 200 of FIG. 14A. Referring to FIG. 14B, a plurality of high-voltage transformers 213, dimmer circuits 226, and connectors 216 are mounted on the inverter circuit board 209, first and second lamp cables 214 and 215 are connected respectively to the both ends of each lamp 206, and the second lamp cable 215 has a connector 217, wherein the inverter circuit board 209 and the lamps 206 are electrically connected to each other by connecting the connectors 216 to the respective connectors 217. In the structure described above, the high-voltage generated at the high-voltage transformer 213 of the inverter circuit board 209 is applied to the electrode of the lamp 206 via the connectors 216 and 217 and via the lamp cables 214 and 215, and then the lamp 6 is lighted on.

For assembling the LCD device 200 shown in FIG. 14A/14B, the lamp cables 214 and 215 have to be wired to the lamp 206, and the connector 217 has to be wired to the lamp cable 215. Especially, the LCD device 200 uses the plurality of lamps 206 thus using a corresponding number of connectors 216 and 217, and lamp cables 214 and 215, and therefore the assembly work described above inevitably involves a lot of labor and cost. Further, the connectors 216 and 217, and the lamp cables 214 and 215 are required to withstand high voltage and therefore have to be costly thus pushing up the product cost. Also, since the high-voltage transformer 213 is mounted on the inverter circuit board 209 attached to the back side of the backlight device, it is difficult to reduce the thickness of the backlight device, and at the same time since the lamp 206 and the high-voltage transformer 213 are electrically connected to each other by the connectors 216 and 217, a protection circuit means has to be provided in consideration of poor connection, thus also pushing up the product cost.

SUMMARY OF THE INVENTION

The present invention has been made in light of the above circumstances, and it is an object of the present invention to provide a backlight device in which a lamp is directly attached to a transformer thereby achieving cost reduction and also enhanced reliability, and also to provide an LCD device incorporating such a backlight device.

In order to achieve the object described above, according to a first aspect of the present invention, there is provided a backlight device which includes a frame having an open space, and a light diffusing plate disposed over the frame, which further includes at least one lamp unit each comprising at least one transformer and at least one discharge lamp and disposed in the open space of the frame such that the discharge lamp and the transformer are arranged in the substantially same pane, and which also includes a circuit board for lighting the discharge lamp, which is disposed at the back surface of the frame and at which the transformer is mounted at. In the backlight device described above, the transformer includes: two terminal blocks having terminal pins implanted thereat; a bobbin having a winding core member and having a primary winding and first and second secondary windings wound around an outer circumference of the winding core member; a magnetic core; and two lamp connecting terminals attached respectively to the terminal blocks and connected respectively to the first and second secondary windings, wherein the discharge lamp is attached to the transformer with electrodes of the discharge lamp connected directly to the lamp connecting terminals of the transformer, thus forming the lamp unit into a integral structure.

In the first aspect of the present invention, the circuit board may be separated into a first circuit board at which the transformer is mounted and a second circuit board at which an inverter circuit to drive the primary side of the transformer is mounted, and the first and the second circuit boards may be electrically connected to each other by connecting respective connectors of the first and second circuit boards.

In the first aspect of the present invention, the two terminal blocks may be disposed respectively at both ends of the winding core member of the bobbin and are each composed of two segments opposing each other with an open space disposed therebetween, the two lamp connecting terminals may be each disposed at a face of one of the two segments opposing the other segment, a fixing means for fixedly attaching the discharge lamp may be disposed at each of the terminal blocks, and the discharge lamp of the lamp unit may be attached to the terminal blocks with the electrodes of the discharge lamp connected directly to the lamp connecting terminals.

Thus, according to the present invention, since the discharge lamp and the transformer are structured into an integral and rigid unit such that the electrodes of the discharge lamp are connected directly to the lamp connecting terminals disposed at the bobbin of the transformer, the discharge lamp can be lighted without using high-withstand voltage connectors or lamp cables. Consequently, the costly component, specifically, the high-withstand voltage connectors and lamp cables, can be eliminated, thus enabling a significant cost reduction. Further, since the electrodes of the discharge lamp are connected directly to the lamp connecting terminals disposed at the bobbin, wire breakages that can happen at the connectors or lamp cable are eliminated, and therefore corona or arc discharges resulting from pseudo-contacts at the wire breakages can be prevented, thus enhancing reliability on the backlight device.

Also, since the lamp unit is disposed inside the frame such that the discharge lamp and the transformer are arranged in the substantially same plane, and since the circuit board for lighting the discharge lamp is disposed at the back surface of the frame with the transformer being mounted thereat, the backlight device can be reduced in height. And, the circuit board is separated into two segments, such that the transformer is disposed at one of the two segments while the inverter circuit to drive the primary side of the transformer is disposed on the other segment with their electrical connection made via their respective connector, whereby the inverter circuit includes only a low-voltage circuit thus ensuring safety.

In the first aspect of the present invention, the transformer may be a leakage flux type transformer. As a result, ballast components at the secondary side of the transformer can be eliminated, thus reducing the number of components.

In the first aspect of the present invention, the first and second secondary windings may be separately disposed so as to sandwich the primary winding, and the respective outputs from the first and second secondary windings may have their polarities reversed with respect to each other such that the first and second secondary windings are shifted in phase from each other by 180 degrees. Consequently, decrease of brightness of the discharge lamp at the low-pressure side can be prevented and at the same time the wire components of high-withstand voltage can be eliminated.

In the first aspect of the present invention, the lamp unit may include one bent discharge lamp and one transformer, and both electrodes of the one bent discharge lamp may be connected respectively to the two lamp connecting terminals of the transformer.

In the first aspect of the present invention, the lamp unit may include two straight discharge lamps and one transformer, and the high-pressure electrodes of the two straight discharge lamps may be connected respectively to the two lamp connecting terminals of the transformer while the low-pressure electrodes of the two straight discharge lamps are connected to each other.

In the first aspect of the present invention, the lamp unit may include two straight discharge lamps and one transformer, and the high-pressure electrodes of the two straight discharge lamps may be connected respectively to the two lamp connecting terminals of the transformer while the low-pressure electrodes of the two straight discharge lamps are grounded.

In the first aspect of the present invention, the lamp unit may include two straight discharge lamps and two transformers, and one electrode of one of the two straight discharge lamps may be connected to one lamp connecting terminal of one of the two transformers while the other electrode of the one straight discharge lamp is connected to one lamp connecting terminal of the other transformer, and one electrode of the other straight discharge lamp may be connected to the other lamp connecting terminal of the other transformer while the other electrode of the other straight discharge lamp is connected to the other lamp connecting terminal of the one transformer.

In the first aspect of the present invention, the backlight device may further include at least one electromagnetic shielding member to partition the open space of the frame into at least one first open space near a side wall of the frame and a second open space occupying an area corresponding to the center area of the frame, the transformer may be disposed in the first open space while at least an effective luminescent portion of the discharge lamp is disposed in the second open space, and the first open space may communicate with an outside atmosphere via openings formed at a bottom wall of the frame.

Due to the structure described above, the electromagnetic filed of the transformer is inhibited from having effects on the liquid crystal panel and the liquid crystal panel driving circuit. Also, since the first open aspect, in which the transformer is disposed, communicates with the outside atmosphere via the openings formed at the bottom wall of the frame, the heat generated by the transformer can be efficiently released outside thus inhibiting the heat from having effects on the discharge lamp. Accordingly the discharge lamp can be stably lighted.

In the first aspect of the present invention, the electromagnetic shielding member may have a top portion located above the transformer, and the distance between the top portion of the electromagnetic shielding member and a top of the transformer may measure at least 2 mm.

With the structure described above, the eddy loss resulting from the leakage flux of the transformer can be minimized, and the leakage flux can be efficiently shielded and inhibited from having effects on the liquid crystal panel, and the like arranged on the backlight device.

In the first aspect of the present invention, the electromagnetic shielding member may have a side portion which has a light reflecting surface toward the second open space, and which is inclined so as to make an obtuse angle with the bottom wall of the frame at the second open space.

Consequently, light emitted from the effective luminescent portion of the discharge lamp can be reflected uniformly thus suitably and efficiently functioning as illumination light for the backlight device.

In the first aspect of the present invention, the electromagnetic member may have openings each allowing the discharge lamp to pass through, and a resilient member may be disposed in each of the openings. This structure softens impact and vibration on the discharge lamp.

According to a second aspect of the present invention, there is provided a liquid crystal display device which includes a liquid crystal panel, and a backlight device as described in the first aspect of the present invention, and which may be for use in a liquid crystal television.

Thus, the present invention achieves reduction in dimension (height) and cost while enhancing reliability, for backlight devices and liquid crystal display devices.

BRIEF DESCRIPTION OF THE DRAWINGS

FIGS. 1A and 1B show a relevant portion of an LCD device incorporating a backlight device according to a first embodiment of the present invention, wherein FIG. 1A is a top plan view of the backlight device omitting components arranged over its frame, and FIG. 1B is a cross sectional view of the LCD device taken along a line A-A in FIG. 1A;

FIGS. 9A and 9B show a relevant portion of an LCD device incorporating a backlight device according to a second embodiment of the present invention, wherein FIG. 9A is a top plan view of the backlight device omitting components arranged over its frame, and FIG. 9B is a cross sectional view of the LCD device taken along a line A-A in FIG. 9A;

FIGS. 12A and 12B show a relevant portion of an LCD device incorporating a backlight device according to a third embodiment of the present invention, wherein FIG. 12A is a top plan view of the backlight device omitting components arranged over its frame, and FIG. 12B is a cross sectional view of the LCD device taken along a line A-A in FIG. 12A;

DETAILED DESCRIPTION OF THE EXEMPLARY EMBODIMENTS

Exemplary embodiments of the present invention will be described with reference to the accompanying drawings.

Figure 1A:
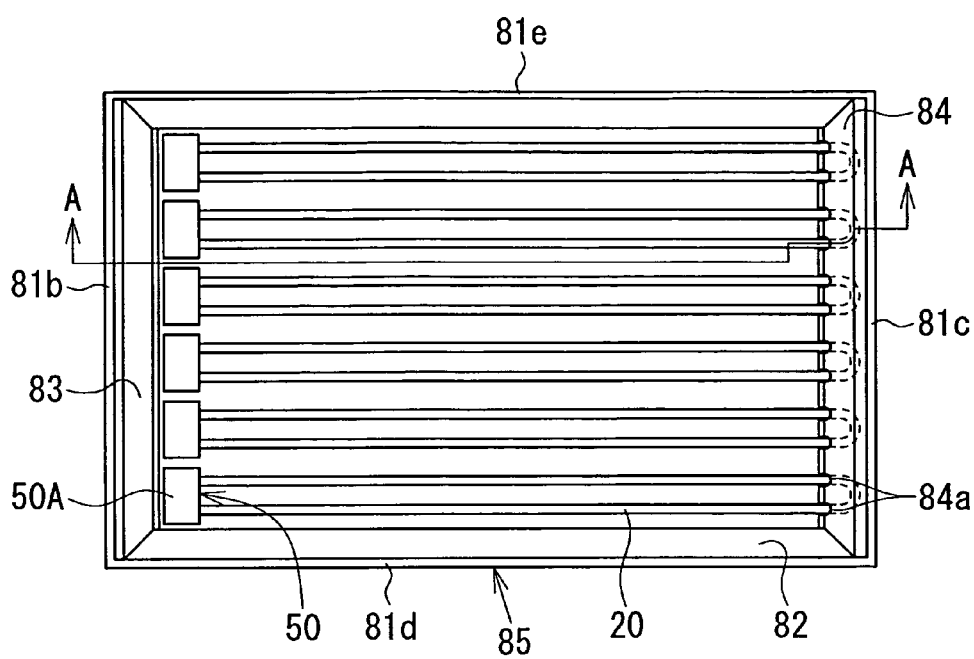
Figure 4:
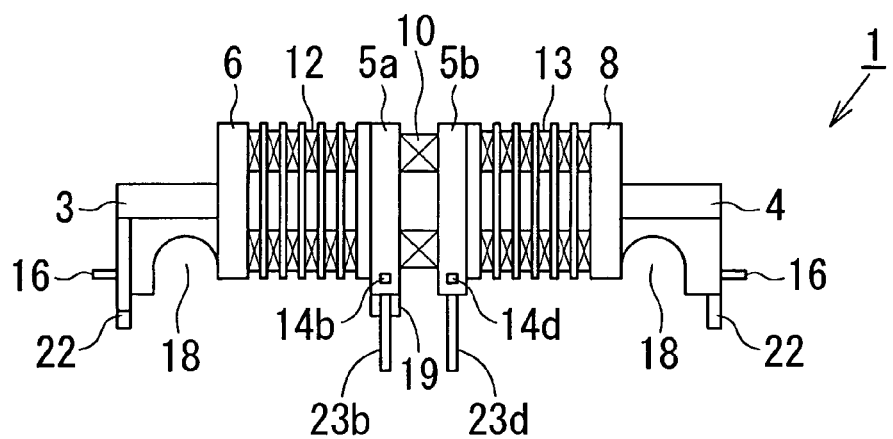
FIG. 4 is a front view of the bobbin of FIG. 3.
Figure 5:
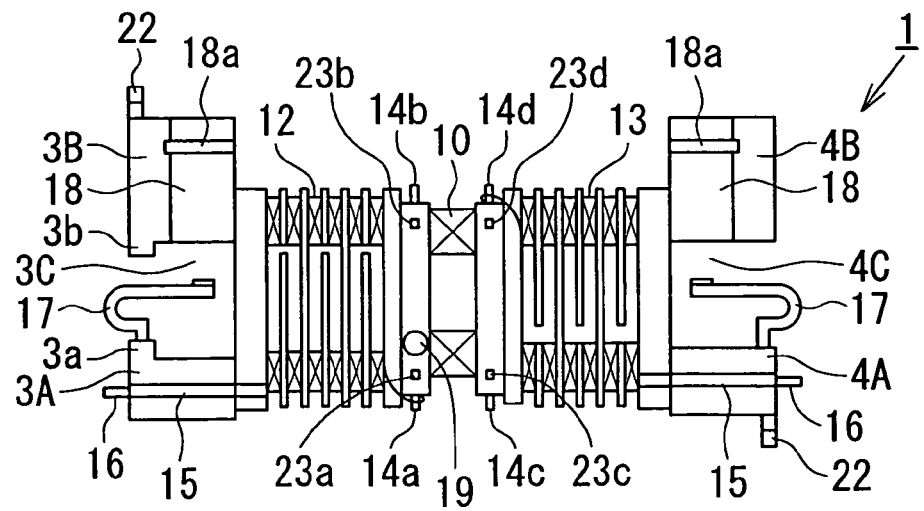
FIG. 5 is a bottom view of the bobbin of FIG. 3.
Figure 6:
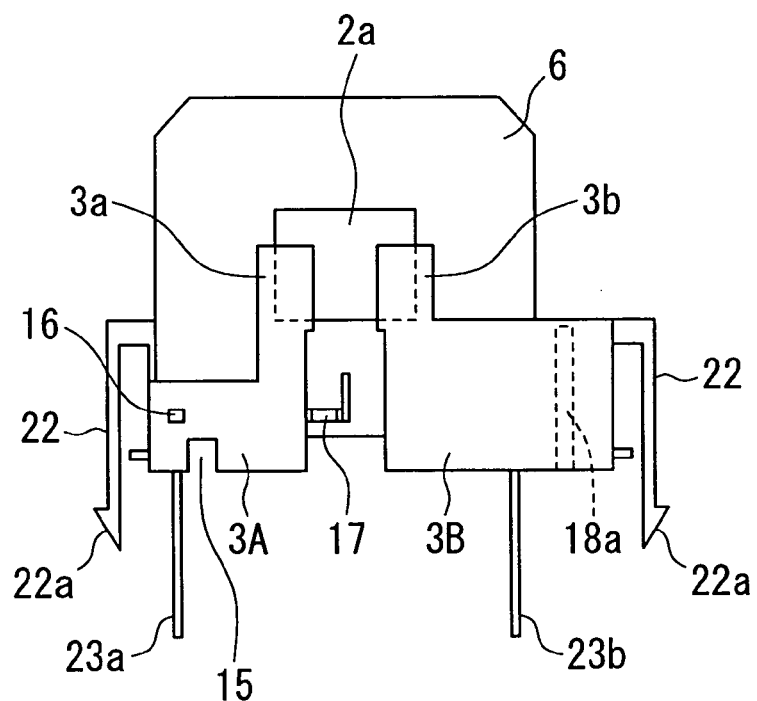
FIG. 6 is a side view of the bobbin of FIG. 3.

A first embodiment of the present invention will be described with reference to FIGS. 1A and 1B. According to the first embodiment of the present invention, an LCD device 90 incorporates a backlight device 80 which includes a frame 85, six discharge lamps 20 housed in the frame 85, six transformers 50A, and first circuit and second boards 26 and 28 disposed at the back side (bottom side in FIG. 1B) of the frame 85 and adapted to light the discharge lamps 20. A plurality of openings 81a and openings 82a are formed respectively at a bottom wall 81f of the frame 85 and at a light reflecting plate 82, and the transformers 50A are each mounted on the circuit first board 26 (hereinafter referred to as "transformer board" as appropriate) with lead terminals 23a to 23d (refer to FIGS. 4 to 6) of the transformer 50A passing through the openings 81a and 82a. An inverter circuit 31 to drive the primary sides of the transformers 50A is mounted on the second circuit board 28 (hereinafter referred to as "inverter board" as appropriate) which is discrete from the transformer board 26. The transformer board 26 and the inverter board 28 are electrically connected to each other via connectors 29 and 30 which are amounted on the transformer board 26 and the inverter board 28, respectively.

The frame 85 is made of a metal plate, such as aluminum, and has the aforementioned bottom wall 81f, side walls 81b to 81e extending vertically upward from the four sides of the bottom wall 81f, and an open top, and light reflecting plates 82 to 84 formed of, for example, white resin are disposed at the inner surfaces of the frame 85. In the present embodiment, the discharge lamp 20 and the transformer 50A constitute a lamp unit 50 as an integral unit, and the lamp unit 50 is housed inside the frame 85 such that the discharge lamp 20 and the transformer 50A are disposed in the substantially same plane along the bottom wall 81f. The discharge lamp 20 of the lamp unit 50 is a cold cathode lamp bent in a U-letter configuration. The transformer 50A and the effective luminescent portion of the discharge lamp 20 including the middle part thereof are disposed in the open space defined by the light reflecting plates 82 to 84. The lamp unit 50 will be detailed later with reference to FIGS. 2 to 7.

Figure 1B:
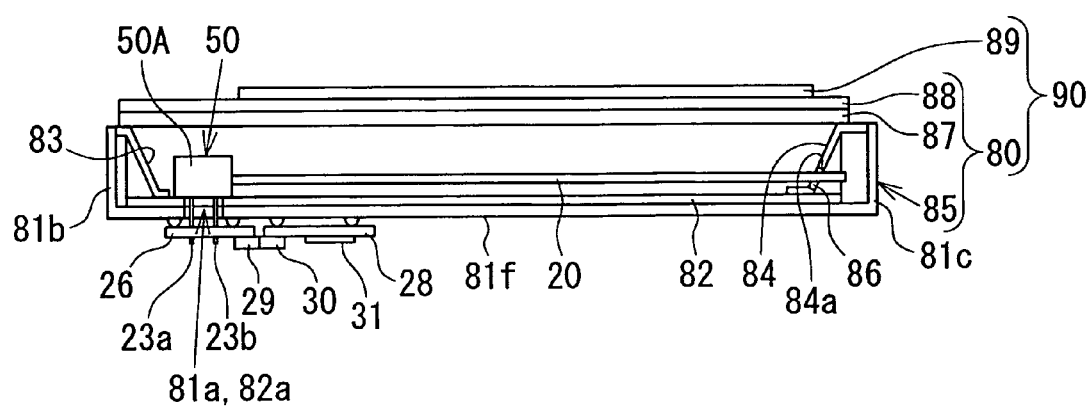

Referring to FIG. 1B, the backlight device 80 further includes a light diffusing plate 87 and a light diffusing sheet 88 arranged over the frame 85, and an LCD panel 89 is disposed on the light diffusing sheet 88 of the backlight device 80 thus constituting the LCD device 90. FIGS. 1A and 1B show that the bending portion of the discharge lamp 20 is located outside the open space defined by the light reflecting plates 82 to 84 such that the bending portion goes through each of openings 84a formed at the light reflecting plate 84 so as to extend beyond the light reflecting plate 84. In such a case, the discharge lamp 20 is preferably supported by an elastic member 86 formed of, for example, silicon resin disposed inside the opening 84a. However, the present invention is not limited to this lamp arrangement, and the discharge lamp 20 including its bending portion may be entirely housed inside the open space defined by the light reflecting plates 82 to 84. In any lamp arrangements, the frame 85 or the light reflecting plates 82 to 84 may include means (not shown in the figures) for appropriately holding the discharge lamps 20, or a covering member to cover the peripheral portion, that is non-effective area, of the backlight device may be disposed on the same level as the open top plane when necessary.

The lamp unit 50 of the backlight device 80 according to the present embodiment will be described with reference to FIGS. 2 to 7.

Figure 2:
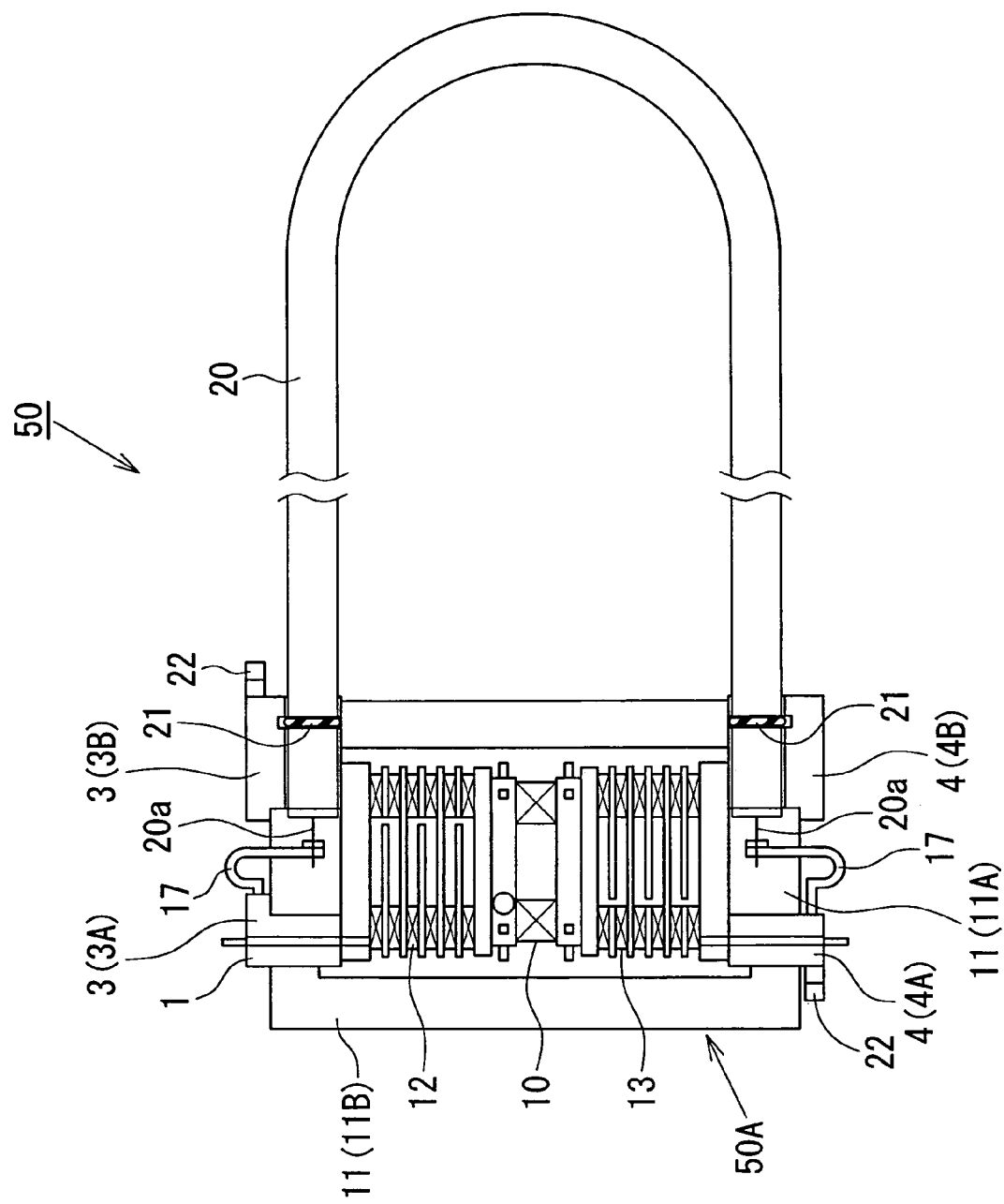
FIG. 2 is a top plan view of an example of a lamp unit using a U-shape lamp.
Figure 3:
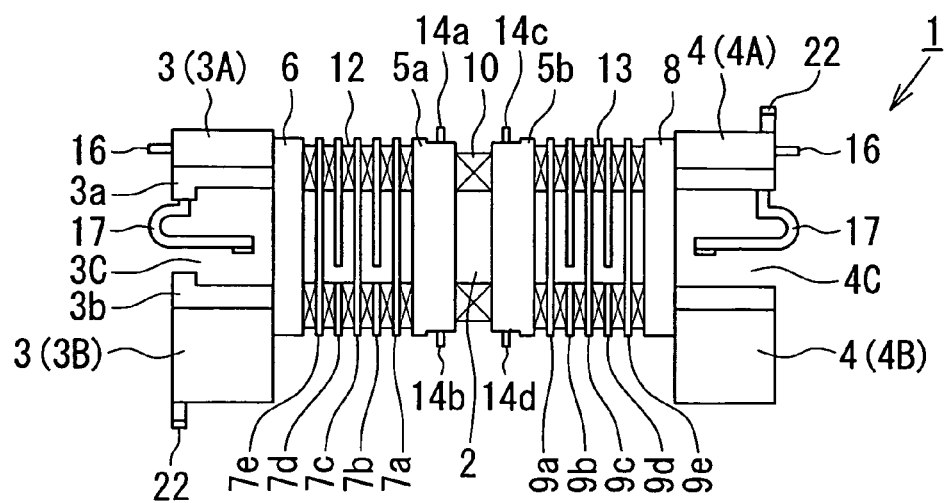
FIG. 3 is a top plan view of a bobbin used in a transformer of in the lamp unit of FIG. 2.

Referring to FIG. 2, the lamp unit 50 includes the transformer 50A and the discharge lamp (cold cathode lamp) 20. The transformer 50A includes a bobbin 1 and a magnetic core 11. The both end portions of the cold cathode lamp 20 bent in a U-letter configuration are fixedly attached to respective segments 3B and 4B of terminal blocks 3 and 4 (to be detailed later) by respective fixing means 21, and both electrodes 20a of the cold cathode lamp 20 are fixedly connected to respective lamp connecting terminals 17 by method of soldering or laser welding. The magnetic core 11 is composed of an I-bar core 11A and a square-frame core 11B. The I-bar core 11A is put through a center opening 2a (refer to FIG. 6) of a winding core member 2, and the square-frame core 11B constitutes a frame outside the bobbin 1. The magnetic core 11 is preferably made of Ni—Zn ferrite having a high electrical resistance. The transformer 50A is preferably structured into a leakage flux type transformer with an air gap of the magnetic core 11 adjusted, whereby the leakage inductance of the transformer 50A is enabled to function as ballast when the cold cathode lamp 20 is lighted. The cold cathode lamp 20 may alternatively be bent into a squared U-letter configuration.

Referring to FIGS. 3 to 6, the bobbin 1 includes the aforementioned terminal blocks 3 and 4 which are formed integrally with the winding core member 2 so as to be located at respective ends of the winding core member 2. In this connection, the terminal block 3/4, as win be further discussed later, is composed of two segments 3A/4A and 3B/4B which oppose each other with an open space 3C/4C formed therebetween. The bobbin 1 also includes flanges 5a and 5b formed integrally with the winding core member 2 and located at the outer circumference of the winding core member 2. A primary winding 10 is wound between the flanges 5a and 5b, and the lead wires of the primary winding 10 are bound respectively around terminal pins 14b and 14c implanted respectively at the flanges 5a and 5b.

A flange 6 is formed adjacent to the terminal block 3, the distance area between the flange 5a and the flange 6 is partitioned into several areas by a plurality (five in the figure) of flanges 7a to 7e, and a first secondary winding 12 is wound between the flanges 5a and 6 so as to be divided according to the several areas. One lead wire of the first secondary winding 12 is bound around a terminal pin 14a implanted at the side of the flange 5a, and the other lead wire thereof is put through a groove 15 formed at the segment 3A of the terminal block 3 and bound around a terminal pin 16 implanted at the segment 3A.

In the same way, a flange 8 is formed adjacent to the terminal block 4, the distance area between the flange 5b and the flange 8 is partitioned into several areas by a plurality (five in the figure) of flanges 9a to 9e, and a second secondary winding 13 is wound between the flanges 5b and 8 so as to be divided into the several areas. One lead wire of the second secondary winding 13 is bound around a terminal pin 14d implanted at the side of the flange 5b, and the other lead wire thereof is put through a groove 15 formed at the segment 4A of the terminal block 4 and bound around a terminal pin 16 implanted at the segment 4A. In the present embodiment, the first and second secondary windings 12 and 13 are wound so that the voltages of the first and second secondary windings 12 and 13 are outputted with their polarities reversed from each other where their phases are shifted from each other by 180 degrees.

As briefly mentioned earlier, the terminal block 3 is composed of the segments 3A and 3B sandwiching the open space 3C, and the terminal block 4 is composed of the segments 4A and 4B sandwiching the open space 4C. A lamp connecting terminal 17 is attached to a face of the segment 3A opposing the segment 3B so as to be suspended in the open space 3A, and in the same way a lamp connecting terminal 17 is attached to a face of the segment 4A opposing the segment 4B so as to be suspended in the open space 4C. Protrusions 3a and 3b formed respectively at the segments 3A and 3B function as stoppers for securely holding the magnetic core 11.

Figure 7:
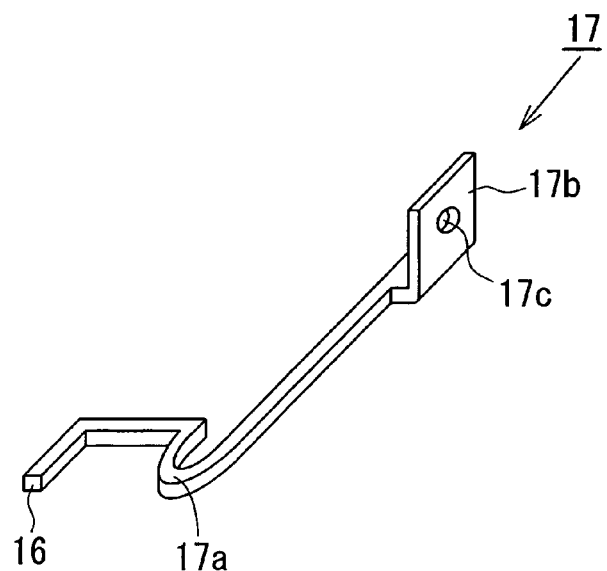
FIG. 7 is a perspective view of an example of a lamp connecting terminal.

Referring to FIG. 7, the lamp connecting terminal 17 is integrally composed of a bending portion 17a having spring function, a flat plate portion 17b, and a pin portion 16. The flat plate portion 17b has a hole 17c, and the electrode 20a of the cold cathode lamp 20 is put through the hole 17c and is connected to the flat plate portion 17b by soldering, laser-welding, or like method.

A recess 18 is formed at each of the bottom faces of the segments 3B and 4B, and the both end portions of the cold cathode lamp 20 are adapted to fittingly sit in the respective recesses 18 and to be fixed therein by the respective fixing means 21 mentioned earlier. The fixing means 21 may be constituted by an elastic ring, for example, an O-ring. Specifically, O-rings as the fixing means 21 are fixedly attached around the circumferences of the both end portions of the cold cathode lamp 20 and are engagingly fitted into grooves 18a each formed at the surfaces of the recesses 18, whereby the cold cathode lamp 20 is securely fixed to the segments 3A and 4A of the terminal blocks 3 and 4. The fixing means 21 may alternatively be constituted either by an adhesive tape, claw or hook, or a flexible resin such as silicon resin, attached or applied to the surface of the recess 18.

Figure 8:
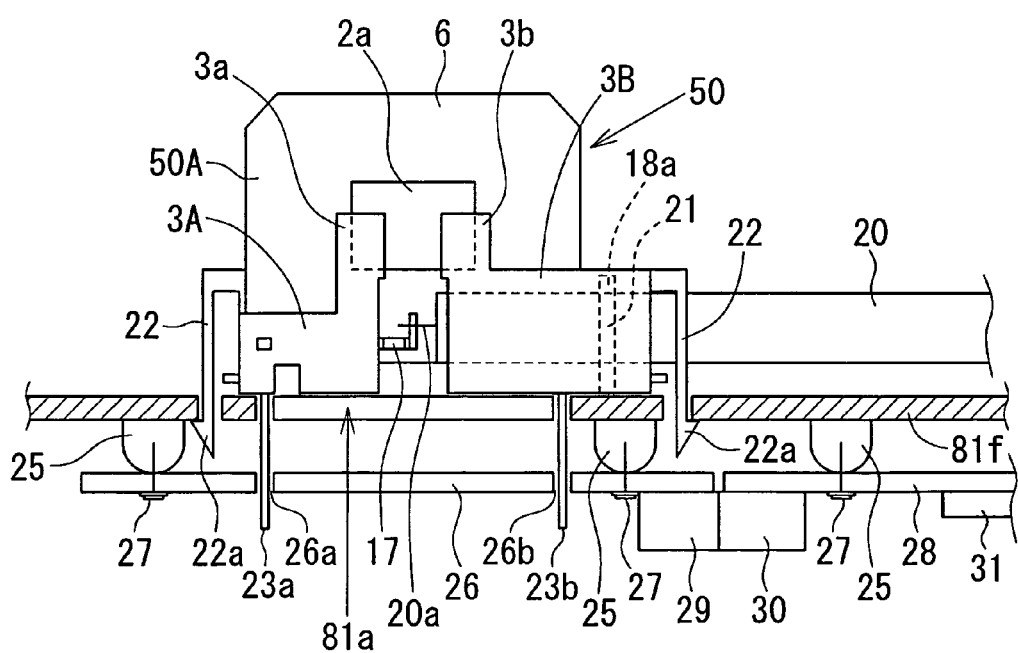
FIG. 8 is a schematic view of the lamp unit of FIG. 2 attached to the backlight device.

Referring to FIG. 8, it is preferable that the lamp unit 50 is fixedly attached to the bottom wall 81f of the frame 85 (in this connection, it should be noted that any components such as the light reflecting plate 82 disposed on the bottom wall 81f as shown in FIG. 1B is considered as a part of the bottom wall 81f). A plurality of holes each adapted to duly position the bobbin 1 are formed at predetermined locations of the bottom wall 81f. An attachment hook 22 is integrally formed with the segment 3B of the terminal block 3 of the bobbin 1 so as to be located at the side of the segment 3B, and also an attachment hook 22 is integrally formed with the segment 4A of the terminal block 4 of the bobbin 1 so as to be located at the side of the segment 4A, wherein the respective attachment hooks 22 are positioned diagonally opposite to each other with respect to the bobbin 1. The present invention is not limited to such an attachment hook arrangement, and the attachment hooks 22 may be positioned respectively at the segments 3A and 4B, or may be disposed at all the segments 3A, 3B, 4A and 4B. Also, the attachment hook 22 may be formed discrete from the bobbin 1.

The lamp unit 50 is duly fixed in position on the bottom wall 81f of the frame 85 such that the attachment hooks 22, the lead terminals 23a to 23d, and further a boss 19 (refer to FIGS. 4 and 5), which are all formed or attached at the bobbin 1 of the transformer 50A, are engaged into respective corresponding openings formed at the bottom wall 81f. In this connection, the attachment hooks 22 each have a barb 22a formed at its distal end thereby ensuring rigid and secure attachment to the bottom wall 81f. Also, the bottom wall 81f has bosses 25 formed at the bottom face thereof, and some of the bosses 25 are adapted to receive the transformer board 26 and also to fixedly hold the transformer board 26 to the bottom wall 81f by means of screws 27 driven into screw holes formed in the bosses 25. The lead terminals 23a to 23d are put through holes 26a and 26b formed at the pattern of the transformer board 26 and are soldered therein. The remaining bosses 25 are adapted to receive the inverter board 28 and to fixedly hold the inverter board 28 to the bottom wall 81f in the same way by means of screws 27.

The transformer board 26 and the inverter board 28 are electrically connected to each other by means of their respective connectors 29 and 30. In the lamp unit 50, the lead terminals 23a to 23d are formed integrally with the terminal pins 14a to 14d, respectively, and the output signal from the inverter circuit 31 is inputted to the primary winding 10 via the lead terminal 23b and the terminal pin 14b, and the lead terminal 23c and the terminal pin 14c.

Thus, since the backlight device 80 according to the present embodiment is structured such that the lamp unit 50 which integrally include the transformer 50A and the cold cathode lamp 20 is housed in the frame 85, the circuit components on the transformer board 26 and the inverter board 28 disposed on the bottom face of the frame 85 can be reduced in height, which contributes to achieving a lower profile of the backlight device 80. In the present embodiment, the transformer 50A, which generates a high voltage, is mounted on the circuit board 26 which is arranged discrete from the circuit board 28 having the inverter circuit 31 mounted thereon, and this structure is preferable in that the inverter circuit 31 includes low-voltage circuits only thereby enhancing safety, but the present invention is not limited to this arrangement, and the transformer 50A and the inverter circuit 31 may be mounted on a single circuit board.

In FIG. 8, the opening 81a formed at the bottom wall 81f has a minimum dimension just to allow the lead terminals 23a to 23d to go through, but may preferably have the largest possible dimension so that heat generated by the transformer 50A can be efficiently released outside the frame 85. Also, in the lamp unit 50, since the lamp connecting terminal 17 is elastically structured due to the bending portion 17a having spring function, the variation resulting from the contraction and the expansion between the frame 85 and the cold cathode lamp 20 can be absorbed by the elastic deformation of the bending portion 17a, thus successfully preventing damages to the cold cathode lamp 20 without using lamp cables.

A second embodiment of the present invention will be described with reference to FIGS. 9A and 9B. In the following description, explanation of the structure and the function identical or similar to those of the first embodiment described above will be omitted, and description will be focused on the difference from the first embodiment.

Figure 9A:
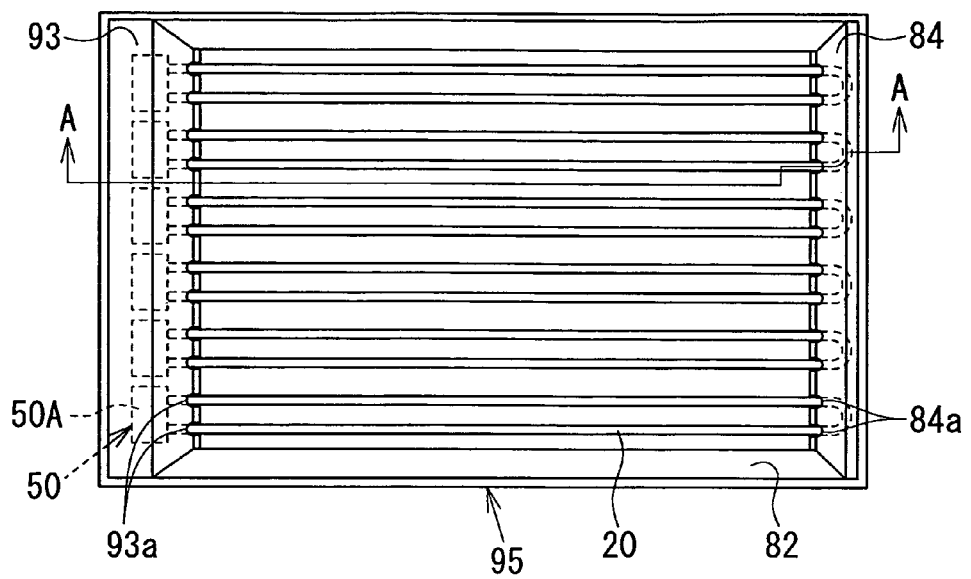
Figure 9B:
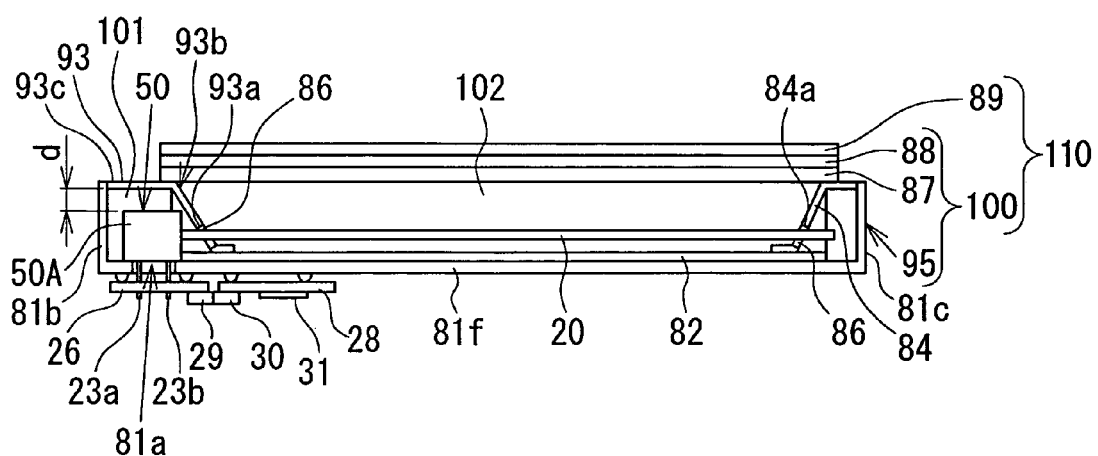

Referring to FIGS. 9A and 9B, according to the second embodiment of the present invention, an LCD device 110 incorporates a backlight device 100 which, while including a frame 95 and a lamp unit 50 basically in the same way as the backlight device 80 according to the first embodiment, differs in that the frame 95 includes an electromagnetic shielding member 93 to partition the entire open space of the frame 95 into two separate open spaces: a first open space 101 located near a side wall 81b of the frame 95; and a second open space 102 occupying an area corresponding to the center of the frame 95, wherein a transformer 50A of the lamp unit 50 is disposed in the first open space 101, and at least the effective luminescent portion of the discharge lamp 20 is disposed in the second open space 102, and wherein the first open space 101 communicates with the outside atmosphere via openings 81a formed at a bottom wall 81f of the frame 95.

The electromagnetic shielding member 93 includes a top portion 93c to be located above the transformer 50A with a distance d preferably measuring at least 2 mm from the top of the transformer 50A. The transformer 50A, due to its structure, generates leakage flux mainly in the upward and downward directions, accordingly if the aforementioned distance d is properly determined, the eddy loss of the electromagnetic shielding member 93 is minimized, and the leakage flux is prevented from having effects on an LCD panel 89. In this connection, an electromagnetic shielding member may be provided at the side wall 81b located behind the transformer 50A if needed, whereby the electromagnetic field generated by the transformer 50A can be shielded thus rendering a drive circuit (not shown) of the LCD panel 89 free from effects of the electromagnetic field. Since the transformer 50A generates leakage flux mainly in the upward and downward directions as described above, there is no specific need to allow any clearance from the side wall 81b.

At least a side portion 93b of the electromagnetic shielding member 93 located toward the second open space 102 is a light reflecting surface, and is inclined so as to make an obtuse angle with the bottom wall 81f at the second open space 102. Consequently, light emitted from the effective luminescent portion of the cold cathode lamp 20 disposed in the second open space 102 is reflected uniformly and efficiently for illumination of the LCD panel 89. Further, the electromagnetic shielding member 93 includes openings 93a to allow the cold cathode lamps 20 to pass through, and a resilient member 86 such as silicon resin is disposed in each of the openings 93a.

The present invention is not limited to the above-described structure of the electromagnetic shielding member 93 as long as the electromagnetic field generated by the transformer 50A can be duly shielded so as to make the discharge lamp 20 free from resultant effects. For example, the side portion 93b may be constituted by a white-coated metal plate such as aluminum, or by a white resin plate coated with a material having an appropriate electrical conductivity and magnetic permeability. In case an electrostatic shielding member is disposed over the frame 95, the top portion 93c of the electromagnetic shielding member 93 may be formed integrally with the electrostatic shielding member.

The electromagnetic shielding member 93 functions also as a thermal shield between the first and second open spaces 101 and 102. Since the first open space 101 communicates with the outside atmosphere via openings 81a, the heat generated by the transformer 50A can be efficiently released outside.

In the first and second embodiments described above, the cold cathode lamp 20 of the lamp unit 50 is bent in a U-letter configuration, but the present invention is not limited to such an arrangement of the cold cathode lamp 20. Other examples of lamp units will hereinafter be described with reference to FIGS. 10 and 11. In explaining the examples of FIGS. 10 and 11, any component parts corresponding to those of the lamp unit 50 in the first and second embodiments are denoted by the same reference numerals, and a detailed description thereof will be omitted below. Also, it is noted that a magnetic core 11 is omitted in FIGS. 10 and 11 for convenience sake.

Figure 10:
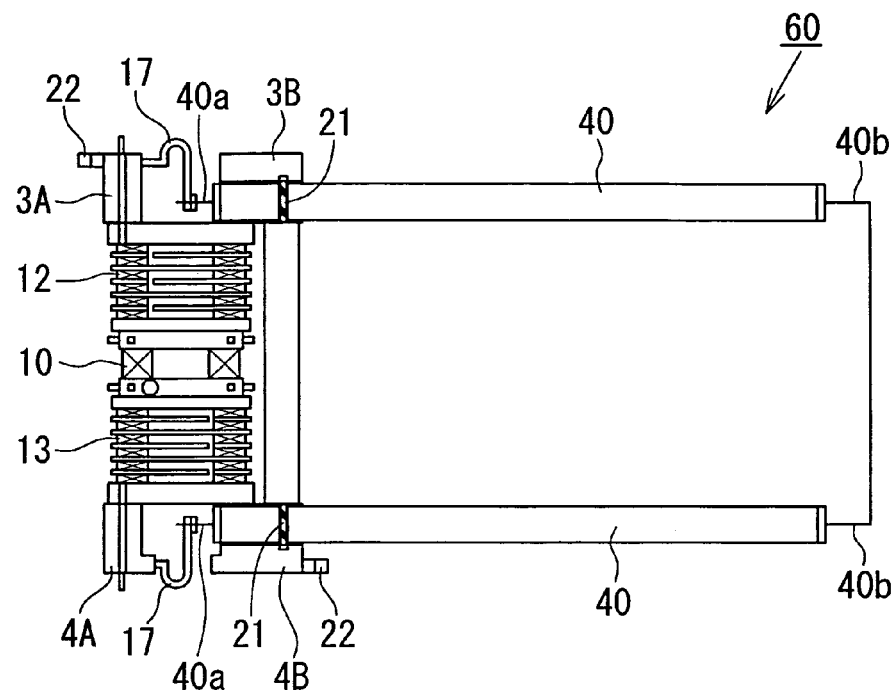
FIG. 10 is a top plan view of another example of a lamp unit suitable for the first and second embodiments of the present invention, in which respective low-pressure electrodes of two straight lamps are connected to each other.
Figure 11:
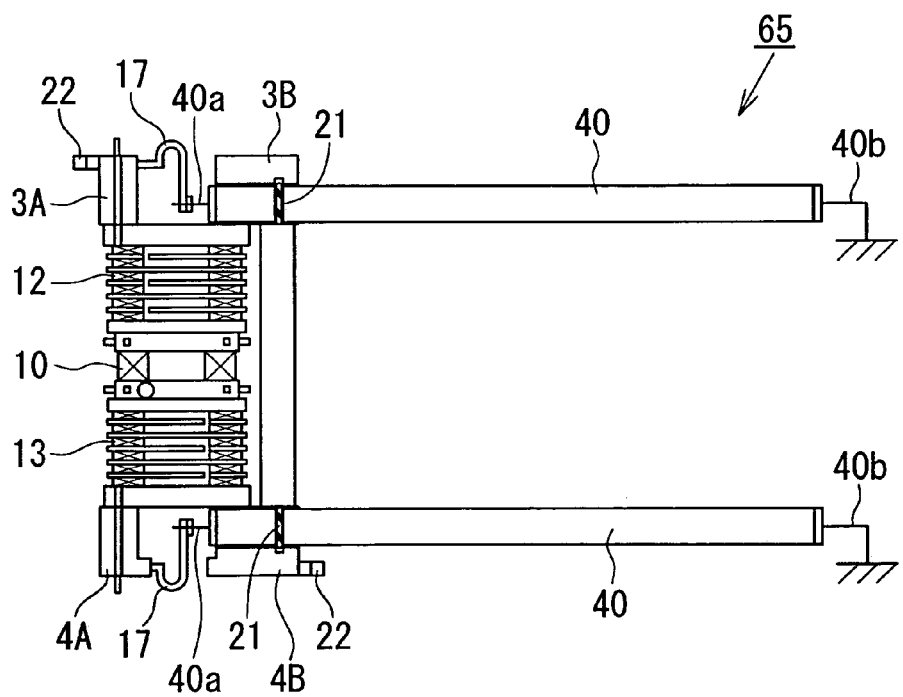
FIG. 11 is a top plan view of still another example of a lamp unit suitable for the first and second embodiments of the present invention, in which respective low-pressure electrodes of two straight lamps are grounded.

Referring to FIG. 10, a lamp unit 60 uses two straight discharge lamps 40 in place of the one cold cathode lamp 20 bent in U-letter configuration as shown in FIG. 2, wherein high-pressure electrodes 40a of the two straight discharge lamps 40 are connected to respective lamp connecting terminals 17 of a bobbin 1 (omitted in the figure) while low-pressure electrodes 40b thereof are connected to each other. In the lamp unit 60, the output voltages from a first secondary winding 12 and a second secondary winding 13 are applied to the respective high-pressure electrodes 40a with their polarities reversed from each other where their phases are shifted from each other by 180 degrees, and therefore return wires needing high withstand voltage are not required. Referring now to FIG. 11, a lamp unit 65 uses two straight discharge lamps 40, wherein high-pressure electrodes 40a of the two straight discharge lamps 40 are connected to respective lamp connecting terminals 17 of a bobbin 1 while low-pressure electrodes 40b thereof are grounded.

The LCD devices 90 and 110 according to the first and second embodiments described above are suitable as a display device for use in a liquid crystal television, especially with a relatively small screen size (37 inches or smaller).

A third embodiment of the present invention will be described with reference to FIGS. 12A, 12B and 13. In the following description, explanation of the structure and the function identical or similar to those of the first and second embodiments described above will be omitted, and description will be focused on the difference from the first and second embodiments.

Figure 12A:
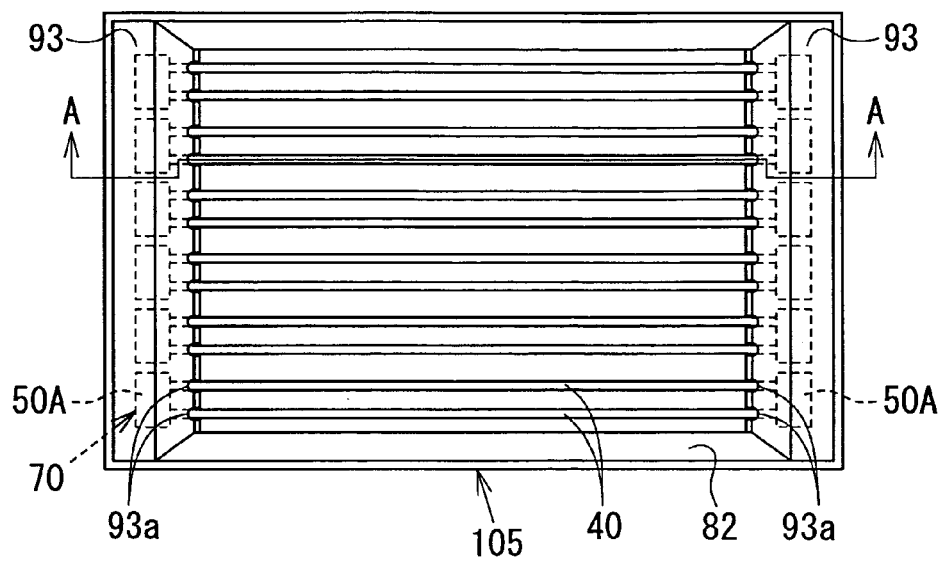
Figure 12B:
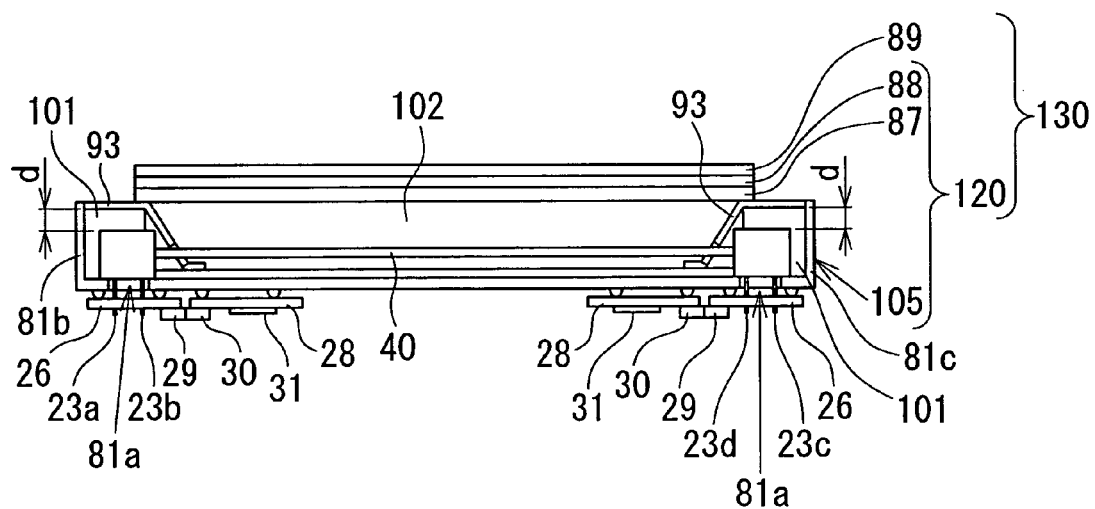
Figure 13:
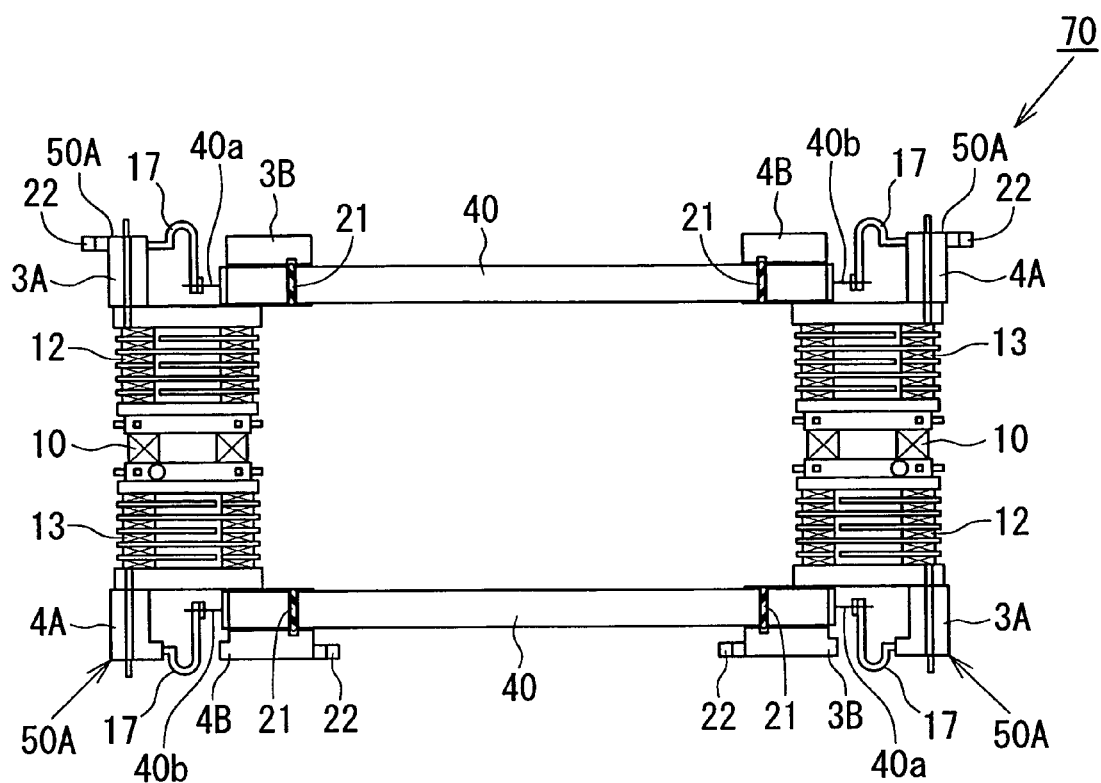
FIG. 13 is a top plan view of a lamp unit used in the backlight device of FIG. 12A/12B.
Figure 14A:
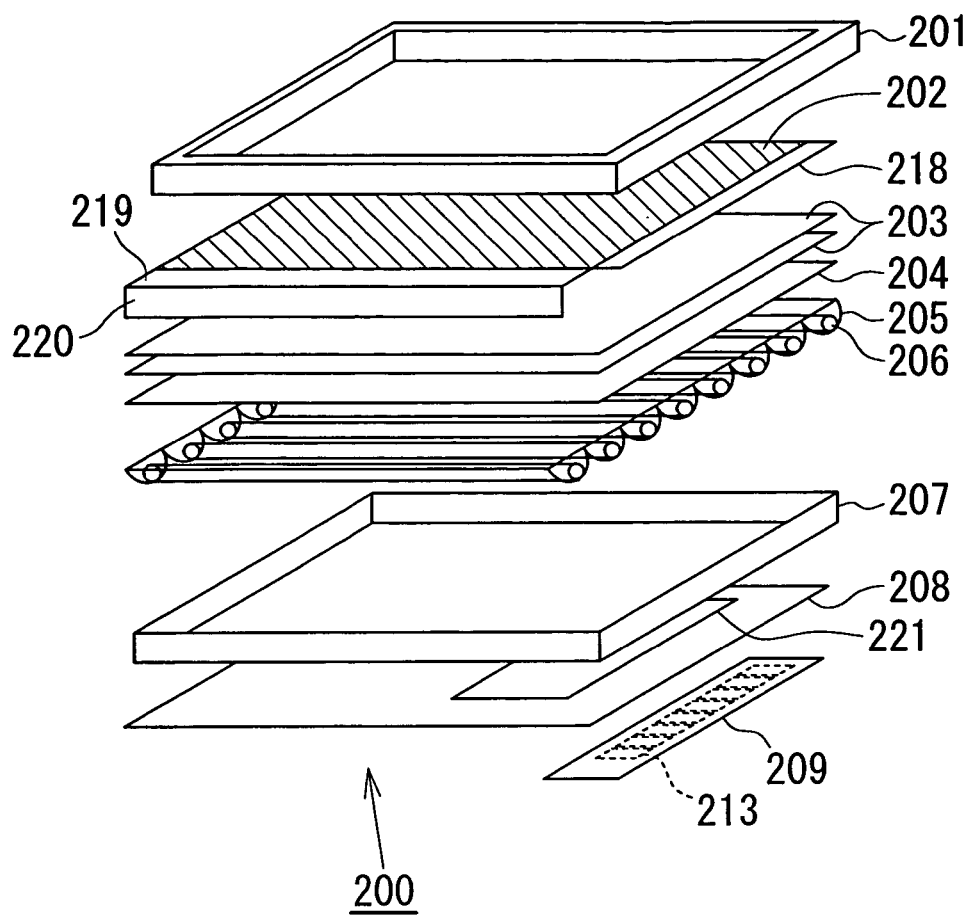
FIG. 14A is a perspective exploded view of a conventional LCD device.
Figure 14B:
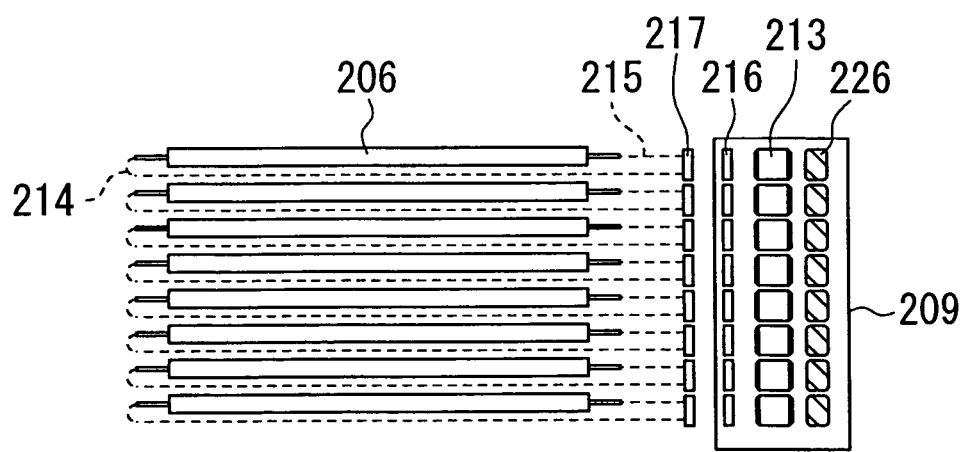
FIG. 14B is a top plan view of a relevant portion of a backlight device incorporated in the LCD device of FIG. 14A.

Referring to FIGS. 12A, 12B and 13, according to the third embodiment of the present invention, an LCD 130 incorporates a backlight device 120, in which each lamp unit 70 includes two straight discharge lamps 40 and two transformers 50A disposed respectively at the both ends of the two straight discharge lamps 40, wherein an electrode 40a of one of the two straight discharge lamps 40 is connected to one lamp connecting terminal 17 of one of the two transformers 50A while an electrode 40b thereof is connected to one lamp connecting terminal 17 of the other transformer 50A, an electrode 40a of the other straight discharge lamp 40 is connected to the other lamp connecting terminal 17 of the other transformer 50A while an electrode 40b thereof is connected to the other lamp connecting terminal 17 of the one transformer 50A, and wherein the output voltages from respective first secondary windings 12 of the bobbins 1 of the two transformers 50A are applied to the respective electrodes 40a of the two straight discharge lamps 40 while the output voltages from respective second secondary windings 13 of the bobbins 1 of the two transformers 50A are applied to the respective electrodes 40b of the two straight discharge lamps 40.

The backlight device 120 according to the third embodiment is structured basically same as the backlight device 100 according to the second embodiment as shown in FIGS. 9A and 9B but differs in that, in order to cope with the structure of the lamp unit 70, two electromagnetic shielding members 93 are provided, and two first open spaces 101 are formed to be located respectively near sides walls 81b and 81c of a frame 105, wherein the two transformers 50A are disposed respectively in the two first open spaces 101. The backlight device 120 thus structured provides advantages same as or similar to those achieved by the backlight device 100 according to the second embodiment.

The LCD device 130 incorporating the backlight device 120 is suitable as a display device for use in a liquid crystal television, especially with a relatively large screen size (37 inches or larger).

The present invention is not limited to the structures of the lamp units explained above. For example, the bending portion 17a of the lamp connecting terminal 17 of the transformer 50A does not necessarily have to be shaped as shown in the relevant drawing as long as the lamp connecting terminal 17 provides spring function, and alternatively the terminal blocks 3 and 4 at which the lamp connecting terminals 17 are implanted may be structured to provide spring function. The cold cathode lamps 20 and 40 may be attached to the side faces of the terminal blocks 3 and 4 in place of the bottom faces thereof. The bobbin 1 is attached to the bottom wall 81f of the frame 85 by means of the attachment hooks 22 in FIG. 8, but it may alternatively be such that protrusions are formed at the bottom of the bobbin 1, and the bobbin 1 is attached to the bottom wall 81f by forcing the protrusions into openings formed at the bottom wall 81f. Also, the magnetic core for the transformer of the lamp unit may be constituted by any one of E+E, U+I, and I+Square cores. In the embodiments described above, the backlight devices 80, 100 and 120 include six lamp units, but the present invention is not limited to this lamp unit arrangement.

What is claimed is:

1. A backlight device comprising:
  at least one lamp unit, each lamp unit comprising:
    (a) at least one transformer, each transformer comprising:
      (i) two terminal blocks having implanted terminal pins;
      (ii) a bobbin having a winding core member and having a primary winding and first and second secondary windings wound around an outer circumference of the winding core member;
      (iii) a magnetic core; and
      (iv) two lamp connecting terminals attached respectively to the terminal blocks and connected respectively to the first and second secondary windings; and
    (b) at least one discharge lamp, each discharge lamp comprising electrodes, the at least one discharge lamp is fixedly attached to the at least one transformer such that two electrodes of the at least one discharge lamp are directly connected respectively to the two lamp connecting terminals of one of the at least one transformer, thus forming the lamp unit into an integral structure;
  a frame having an open space for housing the lamp unit, the lamp unit being disposed in the open space of the frame such that the discharge lamp and the transformer are arranged in a substantially same plane;
  a light diffusing plate disposed over the frame; and
  a circuit board for lighting the discharge lamp, the circuit board being disposed at a back surface of the frame, the transformer being mounted at the circuit board.

2. A backlight device according to claim 1, wherein:
  the circuit board is separated into a first circuit board at which the transformer is mounted and a second circuit board at which an inverter circuit to drive a primary side of the transformer is mounted, and
  the first and the second circuit boards are electrically connected to each other by connecting respective connectors of the first and second circuit boards.

3. A backlight device according to claim 1, wherein:
  the two terminal blocks are disposed respectively at ends of the winding core member of the bobbin and are each composed of two segments opposing each other with an open space disposed therebetween,
  the two lamp connecting terminals are each disposed at a face of one of the two segments opposing the other segment,
  a fixing device that fixedly attaches the discharge lamp is disposed at each of the terminal blocks, and
  the discharge lamp of the lamp unit is attached to the terminal blocks with the electrodes of the discharge lamp connected directly to the lamp connecting terminals.

4. A backlight device according to claim 1, wherein the transformer is a leakage flux type transformer.

5. A backlight device according to a claim 1, wherein:
  the first and second secondary windings are separately disposed so as to sandwich the primary winding, and
  respective outputs from the first and second secondary windings have their polarities reversed with respect to each other such that the first and second secondary windings are shifted in phase from each other by 180 degrees.

6. A backlight device according to claim 5, wherein:
  the lamp unit comprises one bent discharge lamp and one transformer, and
  the two electrodes of the one bent discharge lamp are connected respectively to the two lamp connecting terminals of the transformer.

7. A backlight device according to claim 1, wherein
  the at least one discharge lamp comprises two straight discharge lamps;
  the at least one transformer comprises one transformer;
  the two electrodes are high-pressure electrodes of the two straight discharge lamps that are connected respectively to the two lamp connecting terminals of the transformer; and
  the electrodes of the two straight discharge lamps also comprise low-pressure electrodes that are connected to each other.

8. A backlight device according to claim 1, wherein:
  the at least one discharge lamp comprises two straight discharge lamps;
  the at least one transformer comprises one transformer;

the two electrodes are high-pressure electrodes of the two straight discharge lamps that are connected respectively to the two lamp connecting terminals of the transformer; and the electrodes of the two straight discharge lamps also comprise low-pressure electrodes that are grounded.

9. A backlight device according to claim 1, wherein:

the at least one discharge lamp comprises two straight discharge lamps;

the at least one transformer comprises two transformers;

one electrode of the two electrodes of one of the two straight discharge lamps is connected to one lamp connecting terminal of the two lamp connecting terminals of one of the two transformers, while the other electrode of the two electrodes of the one straight discharge lamp is connected to one lamp connecting terminal of the other transformer; and the other electrode of the two electrodes of the other of the two straight discharge lamps is connected to the other lamp connecting terminal of the two lamp connecting terminals of the other transformer, while the other electrode of the two electrodes of the other straight discharge lamp is connected to the other lamp connecting terminal of the one transformer.

10. A backlight device according to claim 1, further comprising:

at least one electromagnetic shielding member to partition the open space of the frame into at least one first open space near a side wall of the frame and a second open space occupying an area corresponding to a center area of the frame, wherein:

the transformer is disposed in the first open space while at least an effective luminescent portion of the discharge lamp is disposed in the second open space, and the first open space communicates with an outside atmosphere via openings formed at a bottom wall of the frame.

11. A backlight device according to claim 10, wherein the electromagnetic shielding member has a top portion located above the transformer, and a distance between the top portion of the electromagnetic shielding member and a top of the transformer measures at least 2 mm.

12. A backlight device according to claim 10, wherein the electromagnetic shielding member has a side portion which has a light reflecting surface toward the second open space, and which is inclined so as to make an obtuse angle with the bottom wall of the frame at the second open space.

13. A backlight device according to claim 10, wherein the electromagnetic shielding member has openings each allowing the discharge lamp to pass through, and a resilient member is disposed in each of the openings.

14. A liquid crystal display device comprising:

a liquid crystal panel; and the backlight device as described in claim 1.

15. A liquid crystal display device according to claim 14, wherein the liquid crystal display device is used in a liquid crystal television.

* * * * *